(12) United States Patent
Brewster (10) Patent No.: US 9,873,326 B2
(45) Date of Patent: Jan. 23, 2018

(54) POWER TAKEOFF FOR TRACKED VEHICLE

(71) Applicant: Reginald William Brewster, Ontario (CA)

(72) Inventor: Reginald William Brewster, Ontario (CA)

( * ) Notice: Subject to any disclaimer, the term of this patent is extended or adjusted under 35 U.S.C. 154(b) by 54 days.

(21) Appl. No.: 14/925,175

(22) Filed: Oct. 28, 2015

(65) Prior Publication Data

US 2016/0114679 A1   Apr. 28, 2016

(30) Foreign Application Priority Data

Oct. 28, 2014  (CA) .................................... 2869930

(51) Int. Cl.
| | |
|---|---|
| *B60K 17/28* | (2006.01) |
| *B62D 55/14* | (2006.01) |
| *B62M 27/02* | (2006.01) |
| *B62D 55/24* | (2006.01) |
| *B62D 55/07* | (2006.01) |
| *B62D 55/12* | (2006.01) |
| *B62D 55/26* | (2006.01) |

(52) U.S. Cl.
CPC .............. *B60K 17/28* (2013.01); *B62D 55/07* (2013.01); *B62D 55/12* (2013.01); *B62D 55/14* (2013.01); *B62D 55/244* (2013.01); *B62D 55/26* (2013.01); *B62M 27/02* (2013.01); *B60Y 2200/25* (2013.01); *B60Y 2200/252* (2013.01); *B62M 2027/027* (2013.01)

(58) Field of Classification Search
CPC ........ B60K 17/28; B62D 55/07; B62D 55/12; B62D 55/14; B62D 55/26; B62M 27/02
See application file for complete search history.

(56) References Cited

U.S. PATENT DOCUMENTS

| | | | | |
|---|---|---|---|---|
| 6,095,275 | A * | 8/2000 | Shaw ..................... | B62K 13/00 180/185 |
| 2016/0016639 | A1* | 1/2016 | Pard ..................... | B62D 55/244 180/193 |
| 2017/0001689 | A1* | 1/2017 | Bedard .................. | B62M 27/02 |

* cited by examiner

*Primary Examiner* — Sang Kim
(74) *Attorney, Agent, or Firm* — Young & Thompson

(57) ABSTRACT

A tracked vehicle such as a snowmobile is provided with a power takeoff by substitution of a gear wheel for an existing idle wheel around which the track of the vehicle is wound. The gear wheel has a circumference which is equal to the distance between two preselected drive lugs on the track.

9 Claims, 10 Drawing Sheets

POWER TAKEOFF FOR TRACKED VEHICLE

FIELD OF THE INVENTION

This invention relates to power takeoffs and more particularly to modifications to existing vehicles propelled by continuous tracks, sometimes referred to as caterpillar tracks, to equip them with power takeoffs.

CROSS-REFERENCE TO RELATED PRIOR APPLICATION

This application claims priority pursuant to 35 USC 119 of Canadian application no. 2,869,030 filed in the Canadian Intellectual Property Office on Oct. 28, 2014 which application is herein incorporated herein by reference in its entirety.

BACKGROUND OF THE INVENTION

Vehicles propelled by tracks or so-called "tracked vehicles" are useful in travelling over terrain which is inaccessible to vehicles driven by wheels. For example, tracked vehicles such as All Terrain Vehicles (ATV's) are capable of travelling over steep rolling terrain or terrain littered with rocks and other debris. Such vehicles are particularly useful in mineral exploration and in search and rescue work. Other tracked vehicles such as snowmobiles are capable of travelling over snow and ice and are useful for carrying out work in the arctic and also in search and rescue work.

Existing tracked vehicles are usually restricted in the type of terrain over which they are capable of travelling. For example, existing snowmobiles are usually constructed to travel on ice or snow but not on pavement. Existing ATV's are usually restricted to travel on hard ground but not on ice and snow. As well such vehicles are usually not capable of carrying out tasks that are frequently required by persons who travel on snowmobiles or ATV's. For example hunters commonly use tracked vehicles to reach game in dense bush. If heavy game such as moose or deer is bagged, a hoist may be required to remove the game from the bush. Most tracked vehicles lack a hoist. A hoist may also be needed by persons involved in search and rescue work in situations where a persons must be pulled from water or from crevasses.

A power takeoff ("PTO") is a useful addition to an existing tracked vehicle in the above situations. A PTO can be used to activate a hoist, a generator and it can also be used to drive wheels on a snowmobile. In the case of a snowmobile, it is most commonly used for recreational purposes involving travel over snow-covered trails. Such trails are frequently crossed by roads which may be paved or covered by gravel. Pavement and gravel are very damaging to the runners and tracks of snowmobiles. If a snowmobile is equipped with wheels which may be lowered for use and raised when not in use, the wheels can be lowered to lift their runners and track off the ground when the vehicle is travelling over pavement or gravel and can be raised when the vehicle is travelling over snow. A PTO on a snowmobile can be used to activate the wheels.

SUMMARY OF THE INVENTION

I have invented a way in which an existing tracked vehicle can be equipped with a PTO. Briefly my invention involves the substitution of a gear wheel for one of the idle wheels around which the caterpillar track of the existing vehicle is wound. The teeth of the gear wheel are arranged and constructed to mesh with and to be rotated by the drive lugs of the track. The gear wheel has a circumference which is equal to a first distance which is measured parallel to the direction of travel of the track when lying substantially flat and which extends between points at which the leading faces of two selected drive lugs meet the inner wall. The circumference of the gear wheel is closer to the circumference of the idle wheel which it replaces than the distance between any other pair of the drive lugs in the same row of lugs In the detailed description of my invention which follows, the vehicle which is modified by the addition of a PTO is snowmobile but it is to be emphasized that my invention is not limited to the modification of a snowmobile in this manner. Any tracked vehicle may be modified by the addition of a power takeoff according to my invention including large tracked vehicle used by the military such as tanks, and tracked vehicles used in heavy industry such as cranes, power shovels and the like.

DESCRIPTION OF THE DRAWINGS

In the drawings.

Like reference characters refer to like parts throughout the following description.

DESCRIPTION OF PREFERRED EMBODIMENTS

Figure 1:
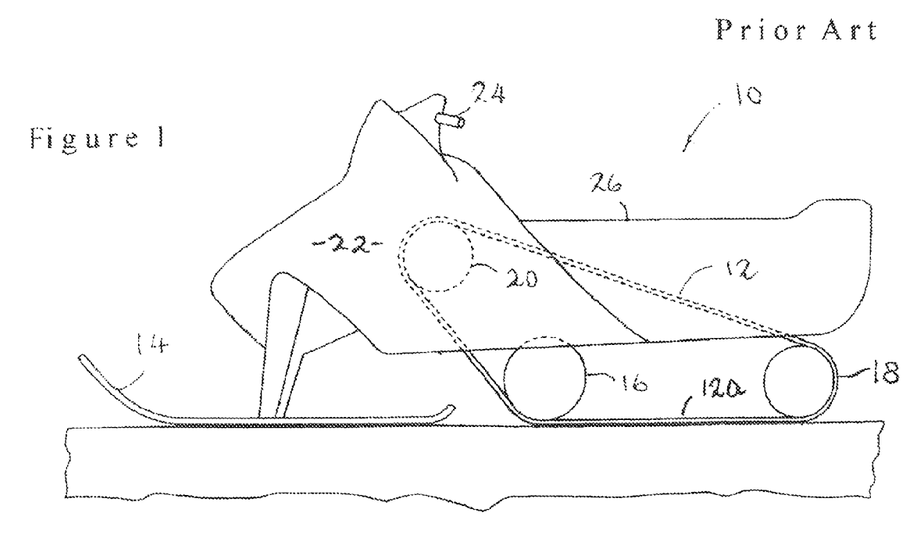
FIG. 1 is an elevation of an existing snowmobile.
Figure 2:
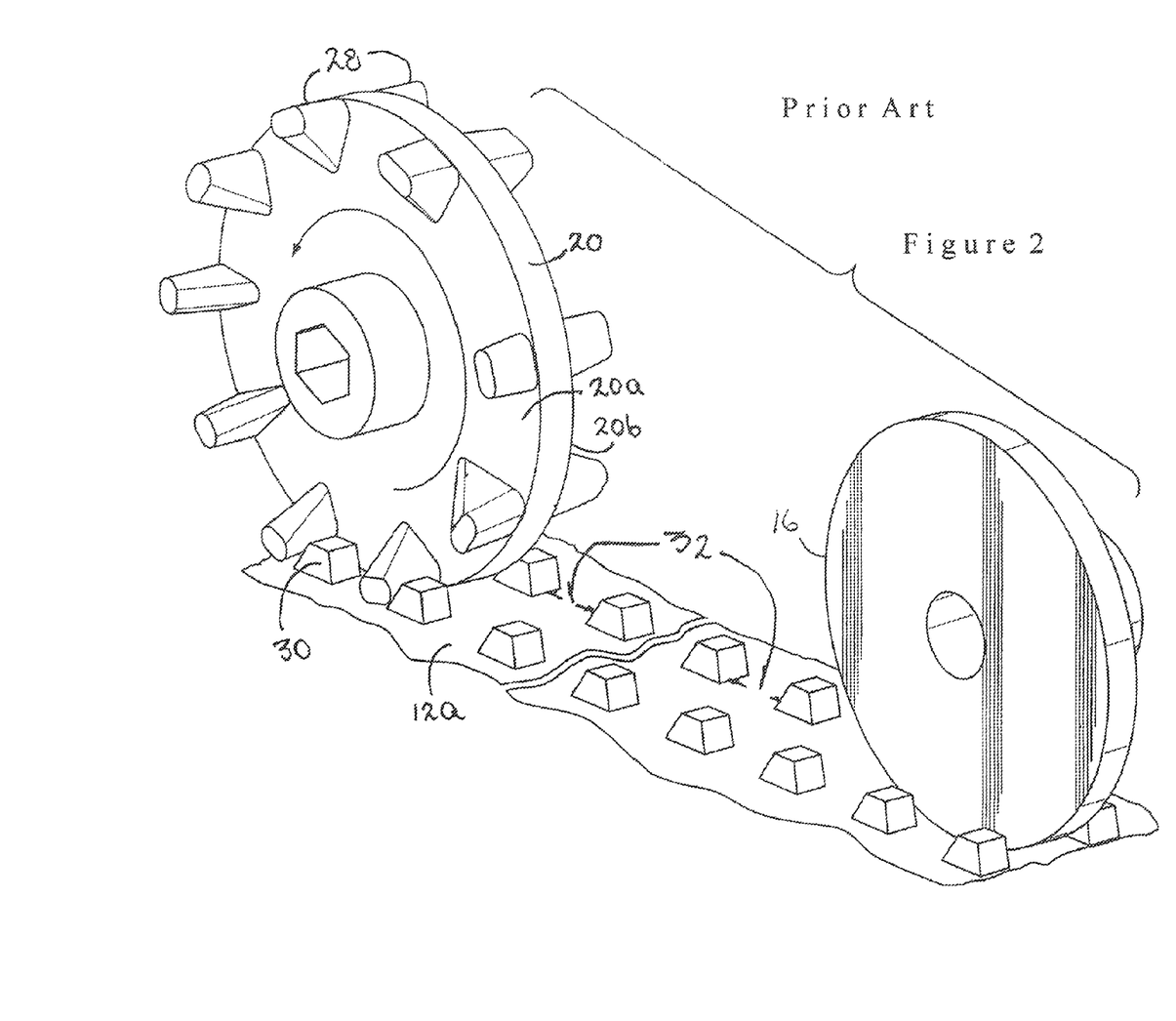
FIG. 2 is a fragmentary perspective view of the drive wheel and idler of an existing snowmobile.

With reference to FIGS. 1 and 2, a conventional snowmobile, generally 10, is illustrated. The snowmobile is equipped with a track 12, sometimes referred to as a caterpillar track, near the rear end of the vehicle for propelling the vehicle forward and runners 14 at the front end of the vehicle on which the vehicle slides on snow or ice. The tracks are wound around front and rear idle wheels 16, 18 and around a drive wheel 20. The drive wheel is driven by a prime mover usually a gasoline powered engine (not illustrated) which is mounted within a cowl 22. A handle bar 24 is provided for steering the vehicle and a bench 26 is provided for the driver of the vehicle.

The oppositely facing circular walls 20$a,b$ of the drive wheel are provided with studs 28 which mate with drive lugs 30 on the inner wall 12$a$ of the track. The drive lugs are arranged in longitudinally extending rows 32 which extend along the entire inner wall of the track.

Figure 3:
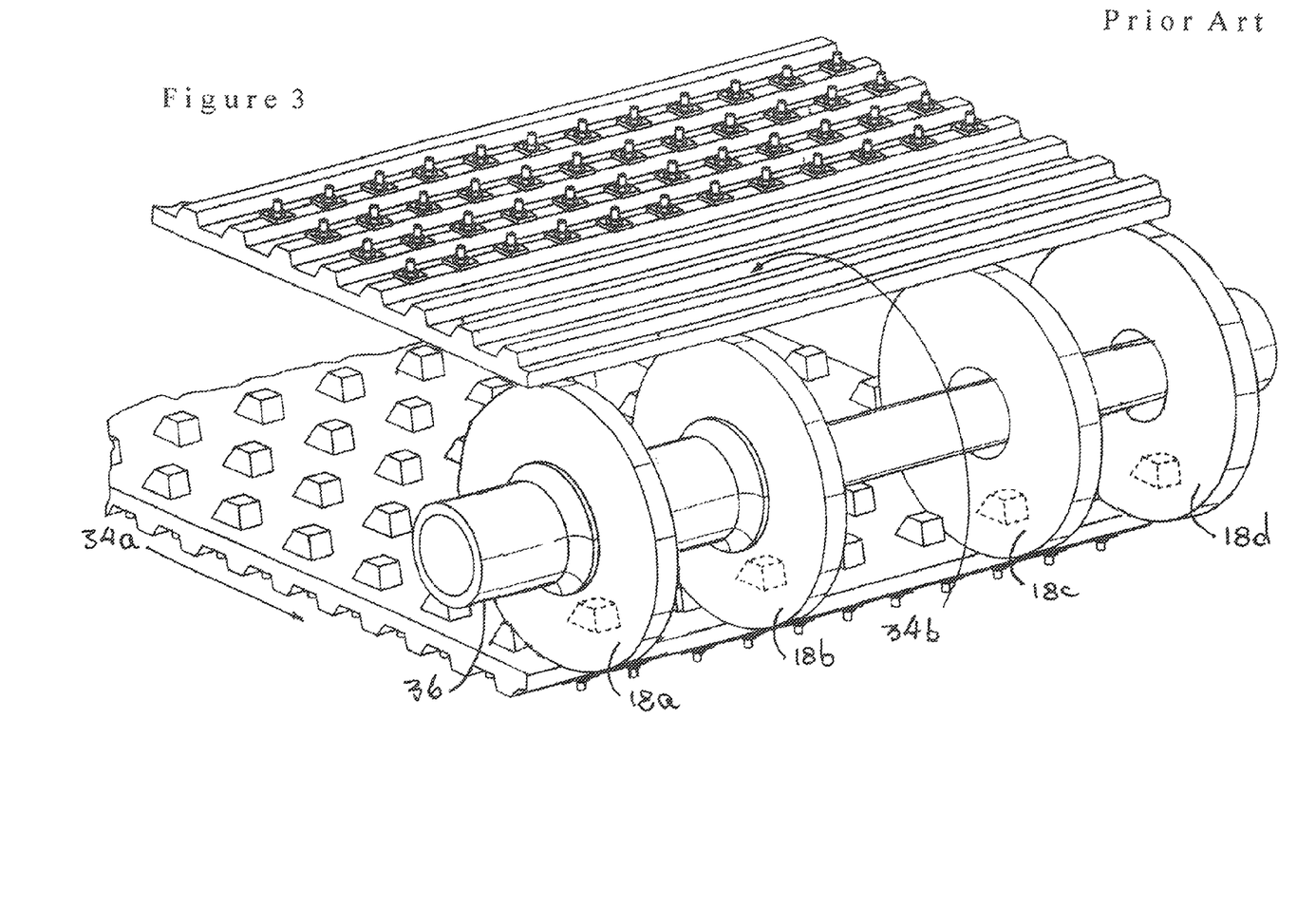
FIG. 3 is a fragmentary perspective view of a track and an array of idle wheels of an existing snowmobile.

With reference to FIG. 3, usually four rear idle wheels 18a,b,c and d are provided around which the track winds as it changes direction from movement toward the rear of the vehicle in its lower stretch of travel indicated by arrow 34a to movement in the opposite direction as indicated by arrow 34b.

Each of the idle wheels is mounted in bearings and revolves around a rear axle 36 which is oriented normal to the direction of travel of the track. The axle is fixed to a pair of parallel longitudinally extending skids or stringers. Attachment is made at points midway between the ends of the axle so that the ends are free and unattached to any part of the snowmobile. The axle being attached to the skids or stringers of a snowmobile remains stationary relative to the frame of the vehicle.

Figure 4:
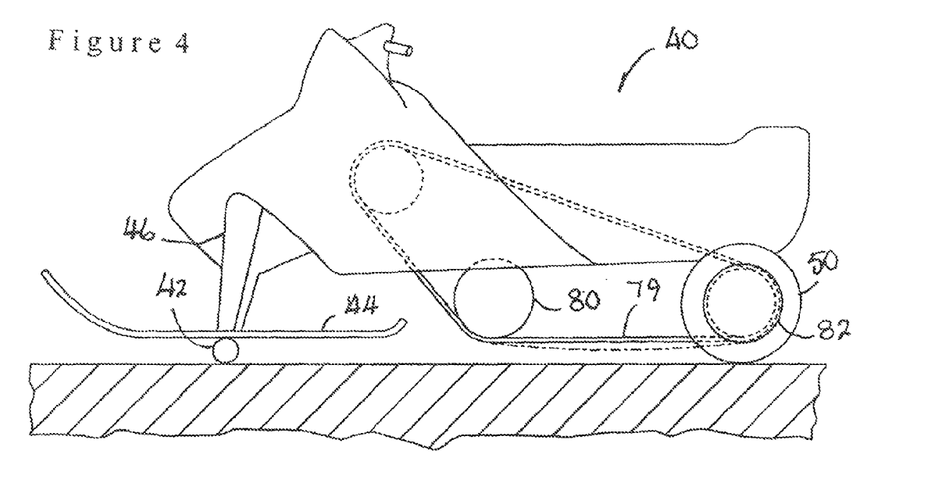
FIG. 4 is an elevation of an existing snowmobile modified according to my invention.

The foregoing description is of a conventional snowmobile. The following description is a preferred embodiment of the applicant's invention which adds a power takeoff to the conventional snowmobile. With reference first to FIG. 4, a snowmobile, generally 40, is equipped with a forward roller or wheels 42 which pivot from a position above the runners 44 of the vehicle (not illustrated) to a position below the runners and directly beneath stem 46 of the vehicle. The roller and wheels are conventional and are provided to allow a snowmobile to travel over a pavement or other abrasive surface without damage to the runners. However what is not conventional is a pair of rear wheels 50 which is mounted for rotation at the rear of the vehicle.

Figure 5:
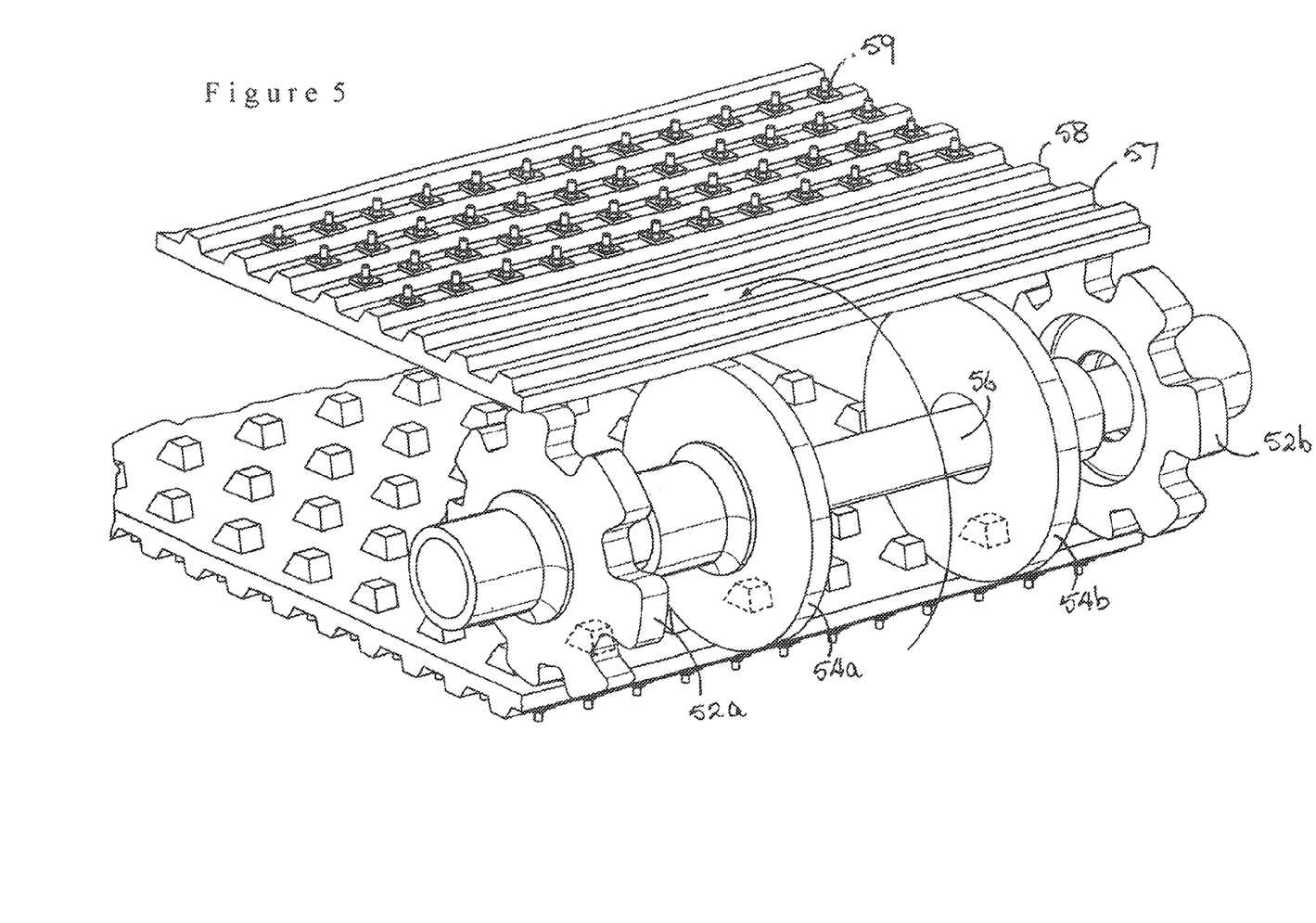
FIG. 5 is a perspective view of a track and an array of gears and idle wheels according to my invention.

With reference to FIG. 5, the outer idle wheels 18a, d of FIG. 3 have been replaced by gear wheels 52a, b. The two idle wheels 54a, b and the two gear wheels 52a, b of FIG. 5 are all mounted in bearings for rotation about a rear axle 56. The axle is fixed to skids or stringers of the vehicle the frame while the idlers and gears are mounted in bearings and revolve freely about the axle. At least one half of the teeth of the gear wheels make contact with drive lugs, referred to below, as the track travels around the gear wheel.

On the outer wall 57 of the track laterally extending ribs 58 are formed. Studs 59 are spaced along the length of each rib. On the lower stretch of the track the studs extend downwardly and function to grip whatever is beneath the snowmobile as it travels forward. The studs accordingly function to improve the traction of the snowmobile on slippery surfaces such as ice or hard packed snow.

Figure 6:
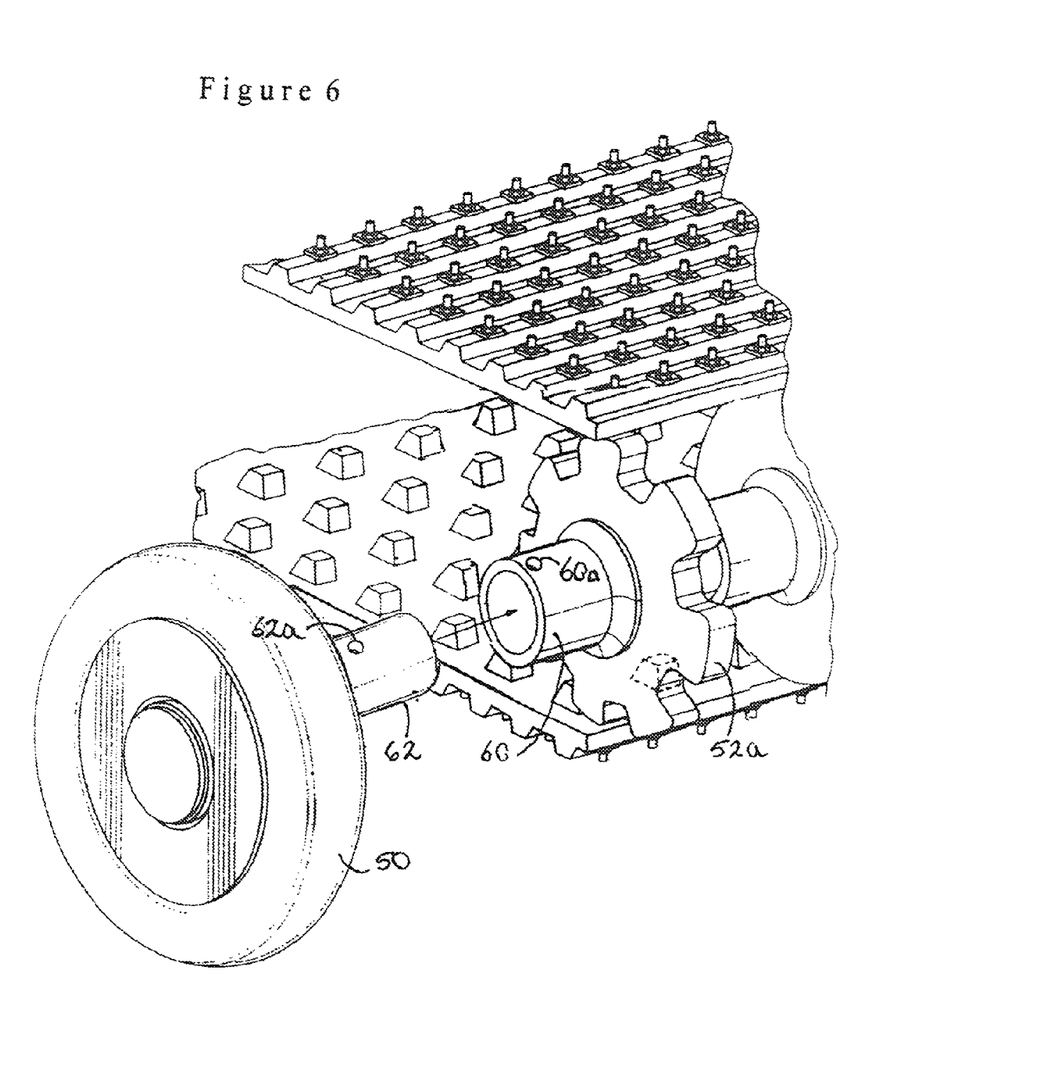
FIG. 6 is a fragmentary perspective view' a wheel in conjunction with a track and array of gears and idle wheels.

In FIG. 6, a collar or coupling 60 is attached to gear wheel 52a by welding or otherwise and the cylindrical opening of the collar receives a spindle 62 connected to wheel 50. The collar is attached to the spindle by a cotter pin (not illustrated) which passes through apertures 60a, 62a in the collar and spindle respectively. The wheel accordingly revolves with gear wheel 52a.

Figure 7:
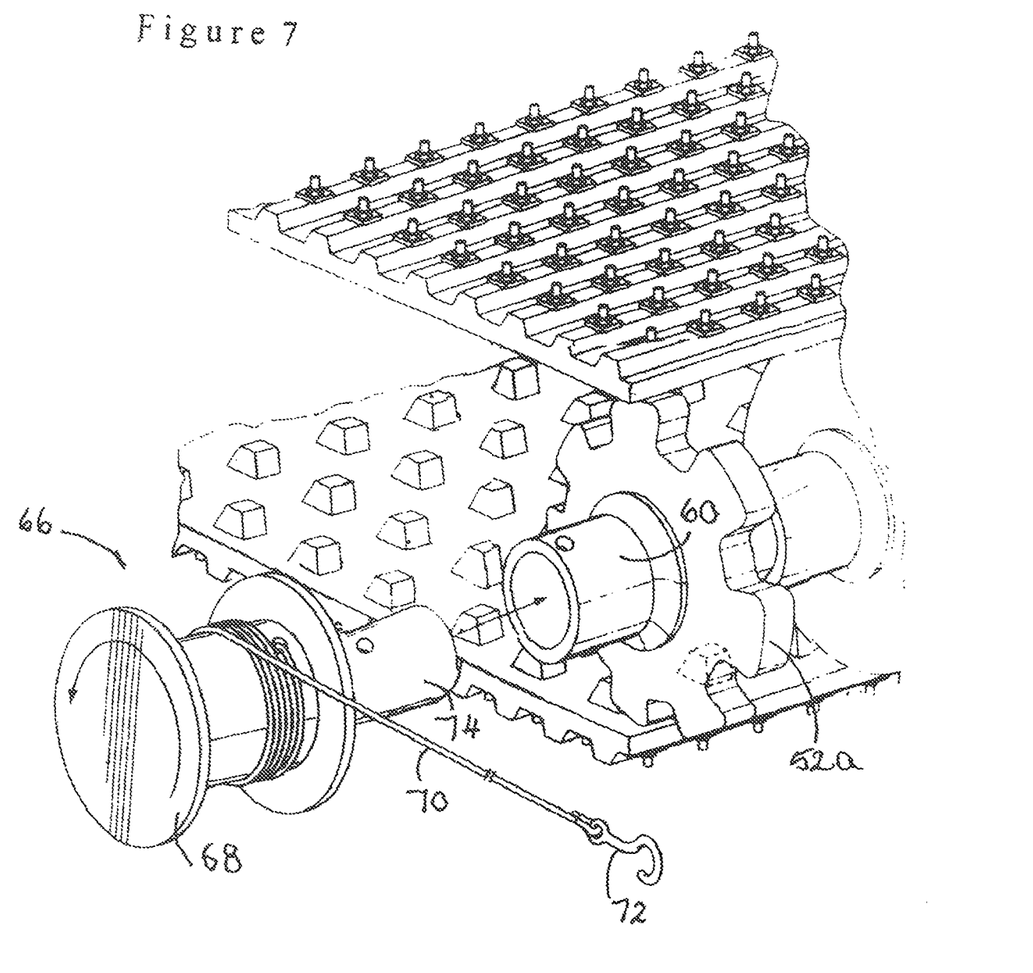
FIG. 7 is the same as FIG. 6 but a hoist has been substituted for the wheel depicted in FIG. 6.

In FIG. 7 a hoist, generally 66 is substituted for the wheel of FIG. 6. The hoist consist of a pulley 68 around which a rope 70 is wound. A hook 72 is attached to the free end of the rope. The pulley revolves with a spindle 74 which is attached to collar 60 by a cotter pin so that the pulley is caused to rotate by gear wheel 52a.

Figure 8:
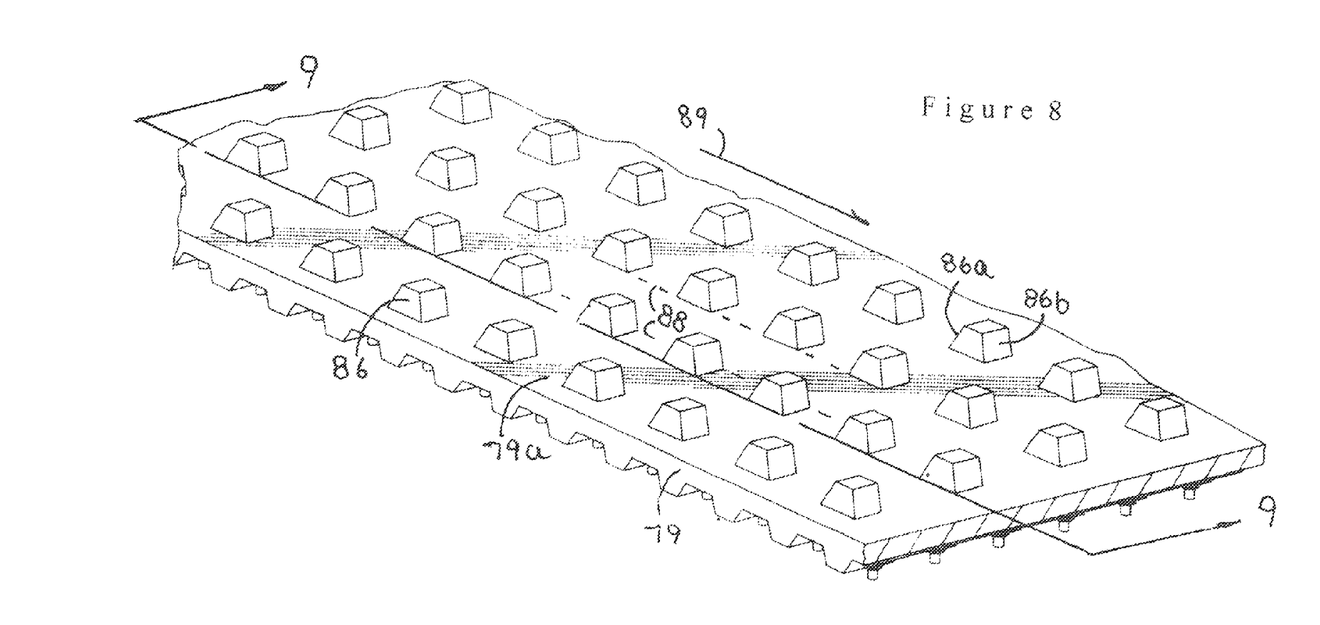
FIG. 8 is a perspective view of an inner wall of a track.

As illustrated in FIG. 4, track 79 is generally flat when it is travelling from the array of forward idle wheels 80 to the array 82 of gear wheels at the rear of the snowmobile. The flat segment of the track is shown in larger scale in FIGS. 8 and 9. With reference first to FIG. 8, on the inner wall 79a of the track which faces upward when flat, drive lugs 86 are arranged in parallel rows 88 and each lug is spaced apart from adjacent lugs in the same row an equal distance. When the snowmobile is moving forward and the flat segment of the track is moving in the opposite direction indicated by arrow 89, each lug has a so-called leading face 86b and an oppositely facing trailing face 86a.

With reference to FIG. 5, as the flat segment of the track reaches the array of gear wheels 52 and idle wheels 54 the idle wheels enter the space between the rows 88 of drive logs while the gear wheels enter and into engagement with the rows of drive lugs.

Figure 9:
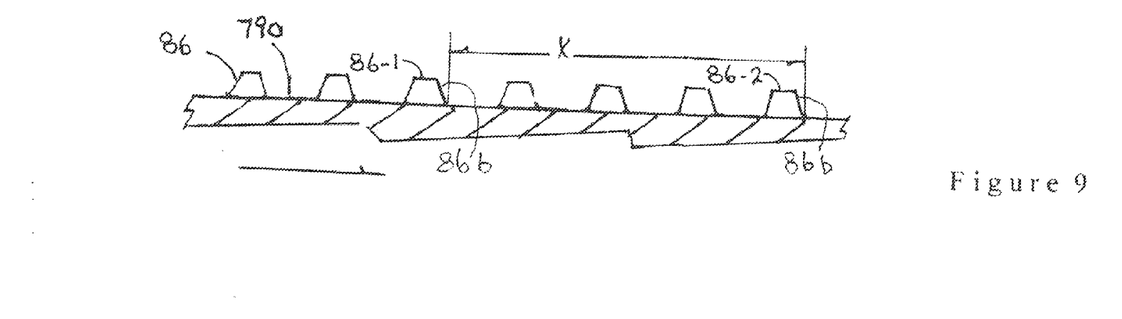
FIG. 9 is an elevation, partly in section, on line 9-9 of FIG. 8.

The gear wheels which are to be substituted for the idle wheels on an existing snowmobile such as the rear idle wheels 18 on the snowmobile illustrated in FIGS. 1-3 will not necessarily have the same diameter. That is because the profile of the gear wheels must take into account the dimensions of the drive lugs and the distance between adjacent lugs in the same row. The profile of the gear wheels can be determined by reference to FIG. 9 and by carrying out the following steps:

(1) while the track lies flat, two drive lugs 86-1, 86-2 are selected which lie approximately as far apart as the circumference of the existing idle wheels 18 (FIG. 3) to be replaced. The circumference of the idle wheels will of course be calculated using the formula:

$$\pi D$$

and such circumference is referred to as an "idle wheel circumference".

(2) the distance, measured parallel to the direction of travel of the track between where the leading faces 86b of the selected lugs meet the inner wall 79a of the track is measured (marked "x").

(3) if the distance is larger than the circumference of the idle wheel, two lugs which are closer together are selected and the distance apart of them is measured. Alternatively, if the distance is significantly less than the idle wheel circumference, the distance between two other drive lugs which are farther apart is measured.

(4) once two lugs are selected which are close to and separated from one another by a distance that is less than idle wheel circumference, then that distance becomes a so-called "first distance" and is the required circumference of the gear wheel which is to replace the existing idle wheel.

The number of teeth in the gear wheel is then determined by counting the number of drive lugs between the leading faces of the selected pair of lugs i.e. 4

Figure 10:
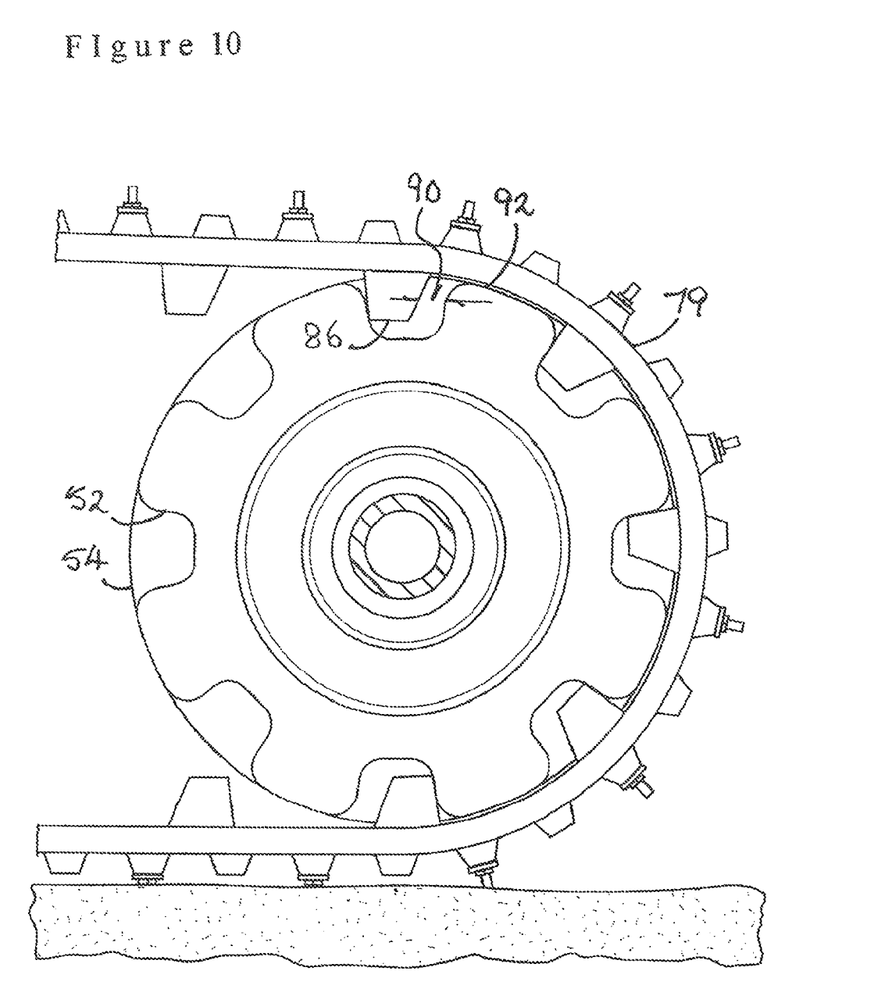
FIG. 10 is an elevation of a track wound around a gear wheel.

With reference to FIG. 10, there should be a gap 90 between a drive lug 86 and adjacent wall of a tooth 92, measured at the circumference of the gear wheel, to allow the lugs to enter and exit the space between the teeth of gear wheel 52 smoothly and without binding as the gear wheel revolves. The shape of the gap of course reflects the shape of the teeth and the drive lugs and is designed so that the gear wheels turns smoothly as the drive lugs mesh with their teeth. Whatever the shape of the teeth and drive lugs, the diameter of the gear wheel remains the same.

Figure 11:
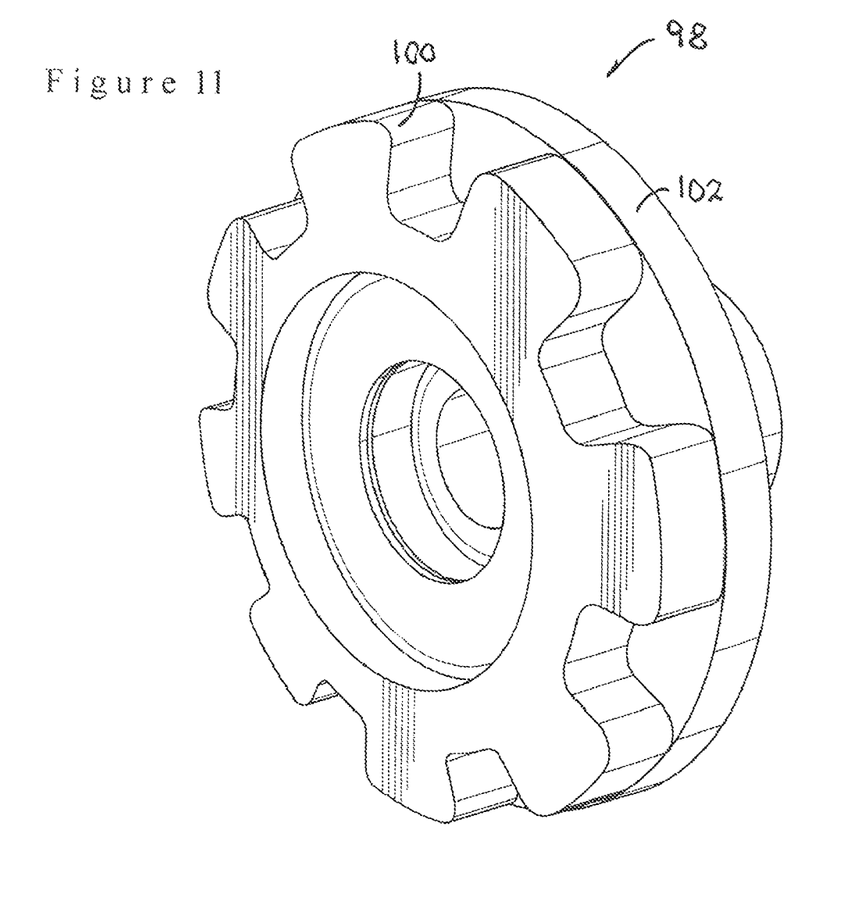
FIG. 11 is a perspective view of a gear wheel modified for use in the array of gears and idle wheels according to the subject invention.

With reference to FIG. 11 the gear wheel generally 98 has a periphery defined in part by teeth 100 and in part by a smooth circular surface 102 similar to that of an idle wheel. Portion 102 is disposed at the outside end of the rear axle while the toothed portion 100 is inside the portion 102 and faces the idle wheels on the axle. Gear wheel 98 has an advantage of providing better support to the outer edge of the track than a gear wheel simply having teeth at its periphery.

It should be noted that the circumference of the idle wheels which revolve around the same axle as the gear wheels should be the same as the circumference of the gear wheels. Thus for example, the idle wheels 54 illustrated in FIG. 5 must have the same circumference as the gear wheels to function in concert with them.

As will be evident from the preceding description, gear wheels substituted for the idle wheels of a conventional snowmobile function as a power takeoff for a hoist, for wheels, for a generator, a pump and for many other purposes.

It will be understood, of course, that modifications can be made in the structure of the power takeoff described above without departing from the scope and purview of the invention as defined in the following claims.

I claim:

1. A method of adding a power takeoff to an existing motor vehicle propelled by a continuous track, said track being wound around a drive wheel and a plurality of idle wheels, and said track being configured to be propelled in a direction of travel by said drive wheel, said track having oppositely facing inner and outer walls and a plurality of drive lugs that are attached to said inner wall, aligned in a plurality of rows, and separated an equal distance apart in each said one of said rows, each one of said drive lugs having oppositely facing leading and trailing faces, said method comprising steps of:
   selecting one idle wheel of said idle wheels which rotates along with others of said idle wheels about an axis;
   selecting a pair of drive lugs that satisfy the following requirements:
      said selected pair of drive lugs lie in a same row,
      said selected pair of drive lugs are spaced apart by a given distance measured between points of contact of the leading faces of said selected pair of drive lugs and a portion of said track, said given distance being parallel to said direction of travel and measured in accordance with said track portion being substantially flat, and
      the given distance is closer to the circumference of said one idle wheel than a measured distance between any other pair of drive lugs in said row;
   providing a gear wheel having a circumference of length equal to the given distance;
   removing said one selected idle wheel from said axis, and substituting said gear wheeler in place of said selected one idle wheel; and
   removing said others of said idle wheels from said axis, and providing substitute idle wheels that have a same circumference as that of said gear wheel in place of said others of said idle wheels on said axis,
   said gear wheel being configured to drive a power takeoff.

2. The method of claim 1, further comprising:
   a step of selecting a number of teeth on said gear wheel for meshing with said drive lugs, a number so selected being equal to the number of said drive lugs in said given distance.

3. The method of claim 1, further comprising:
   providing a second gear wheel with a same shape as said gear wheel;
   selecting and removing a second one of said others of said idle wheels from said axis and substituting said second gear wheel in place of said second one of said others of said idle wheels on said axis, said gear wheel and said second gear wheel being mounted to mesh with drive lugs in separate ones of said rows.

4. The method of claim 1 wherein said axis to which the gear wheel is placed is that of a snowmobile.

5. A power takeoff for a motor vehicle propelled by a continuous track, said track being wound around a drive wheel and a plurality of idle wheels, and said track being configured to be propelled in a forward direction of travel by said drive wheel, said track having oppositely facing inner and outer walls and a plurality of drive lugs aligned in rows and spaced apart along the length of said inner wall, each one of said drive lugs having oppositely facing leading and trailing faces, said idle wheels arranged to rotate about an axis and each of said idle wheels having an idle wheel circumference, said power takeoff comprising:
   a gear wheel placed along said axis of said idle wheels and configured to rotate about said axis along with said idle wheels on said axis,
   said gear wheel having teeth arranged and constructed to mesh with and to be rotated by one row of said rows of said drive lugs,
   said gear wheel having a gear wheel circumference which is equal in length to a given distance between a pair of drive lugs located along a portion of said track in said one row, said pair of drive lugs being spaced apart from each other by the given distance, the given distance being closer in length to said idle wheel circumference than a distance between any other pair of said drive lugs in said one row, the lengths of said distances being measured along a direction parallel to the direction of travel and in accordance with said portion of said track being substantially flat, and further being measured between points at which the leading faces of said pair of drive lugs and said other pair of drive lugs meet said inner wall of said track, and
   said gear wheel circumference being same as that of said idle wheel circumference of said idle wheels.

6. The power takeoff of claim 5, wherein said gear wheel has radially extending teeth, a quantity of said teeth being equal to a quantity of said drive lugs in said given distance along said one row.

7. The power takeoff of claim 5, wherein the outer perimeter of said gear wheel is composed of two portions, a first of said two portions being defined by a smooth circular outer wall, and a second of said two portions being defined by a plurality of teeth.

8. The power takeoff of claim 5, further comprising:
   a second gear wheel, different from said gear wheel, having a same shape as said gear wheel, said second gear being located on said axis, said second gear wheel being mounted to mesh with drive lugs in a separate row of said rows from said one row of said rows.

9. The power takeoff of claim 5, wherein said axis to which the gear wheel is placed is that of a snowmobile.

* * * * *